United States Patent [19]

Alsenz

[11] Patent Number: 5,157,931
[45] Date of Patent: Oct. 27, 1992

[54] REFRIGERATION METHOD AND APPARATUS UTILIZING AN EXPANSION ENGINE

[76] Inventor: Richard H. Alsenz, 2402 Creekmeadows, Missouri City, Tex. 77459

[21] Appl. No.: 591,433

[22] Filed: Oct. 1, 1990

Related U.S. Application Data

[63] Continuation-in-part of Ser. No. 505,557, Apr. 6, 1990, which is a continuation-in-part of Ser. No. 146,285, Jan. 21, 1988, Pat. No. 4,951,475.

[51] Int. Cl.$^5$ ................................................. F25B 1/00
[52] U.S. Cl. ........................................ 62/116; 62/175; 62/211
[58] Field of Search ................... 62/87, 509, 175, 211, 62/116, 500

[56] References Cited

U.S. PATENT DOCUMENTS

| | | | |
|---|---|---|---|
| 2,494,120 | 1/1950 | Ferro, Jr. ................................. | 62/87 |
| 2,737,031 | 3/1956 | Wulle ..................................... | 62/87 |
| 2,986,899 | 6/1961 | Schenk et al. ......................... | 62/216 |
| 3,934,424 | 1/1976 | Goldsberry . | |
| 4,086,772 | 5/1978 | Williams ................................ | 60/651 |
| 4,094,169 | 6/1978 | Schmerzler ........................... | 60/498 |
| 4,170,116 | 10/1979 | Williams ................................ | 62/116 |
| 4,208,885 | 6/1980 | Schmerzler ........................... | 62/403 |

Primary Examiner—William E. Wayner

[57] ABSTRACT

A refrigeration system is disclosed which utilizes an expansion engine in the condensate line of the condenser. The liquid leaving the condenser drives the expansion engine when it passes therethrough. The expansion engine, in turn, drives a compressor which compresses gas from the reservoir to the condenser. The discharge of the liquid refrigerant from the condenser is controlled by a micro-controller circuit. The micro-controller circuit increases the flow when the temperature difference between the liquid refrigerant and the ambient air flowing across the condenser is below a predetermined value and decreases the flow when the temperature difference is above a predetermined value. A liquid pump is used to elevate the pressure of the liquid refrigerant leaving the receiver.

13 Claims, 4 Drawing Sheets

REFRIGERATION METHOD AND APPARATUS UTILIZING AN EXPANSION ENGINE

CROSS-REFERENCE TO RELATED APPLICATIONS

This application is a continuation-in-part of copending U.S. patent application Ser. No. 505,557, filed Apr. 6, 1990, which is a continuation-in-part of U.S. patent application Ser. No. 146,285, filed Jan. 21, 1988, now U.S. Pat. No. 4,951,475.

TECHNICAL FIELD

This invention relates to a refrigeration system and more particularly to apparatus and method for improving refrigeration efficiencies by utilizing an expansion engine in the refrigeration system for extracting energy from the expansion process and using it to improve the overall system efficiency.

BACKGROUND OF THE INVENTION

In a vapor compression refrigeration system, low pressure gas refrigerant is compressed to a high pressure gas, which is then condensed in a condenser to a liquid. The liquid refrigerant is evaporated in an evaporator into the low pressure gas. Several systems have been proposed which utilize the energy of the liquid refrigerant that flows from the high pressure side (the condenser side) to the low pressure side (the evaporator side) to improve the overall efficiency of the refrigeration system. For example, U.S. Pat. Nos. 3,934,424, 4,170,116, 4,086,772 and 4,208,885 teach the use of an expansion engine in the vapor cycle to improve the overall efficiency of the refrigeration system. However, these and other systems have gained very little or no commercial acceptance. Furthermore, the art, in general, has taught against the use of expansion engines in refrigeration systems. For example, David Mooney in the textbook, *Mechanical Engineering Thermodynamics* states on page 467, line 2, "In actual cases, after allowing for the irreversibility of the real engine process, the gain by use of the expansion engine is usually negligible and such machines are not used in modern vapor refrigeration plants."

In a closed loop refrigeration system, potential energy is stored in the refrigerant pressure difference between the high side pressure and the low side pressure. Energy is wasted when this potential energy is changed into kinetic energy in the expansion valve of the refrigeration system. Also, energy is stored in the liquid refrigerant temperature on the high pressure side, which is changed into kinetic energy of the molecules when the liquid refrigerant boils in the evaporator. The prior art refrigeration systems attempt to improve the efficiency by utilizing this kinetic energy to drive or operate an expansion engine, which in turn is used to perform some useful function. However, the prior art systems do not overcome the energy waste because these systems do not properly control the expansion valve throttling process and the flow of the refrigerant through various elements of the refrigeration system.

The use of an expansion engine as taught in prior art systems, i.e., on an evaporator, produces an inherent conflict, which can be understood by considering the following two extremes of the flow of the refrigerant through the evaporator.

In the one extreme, if the refrigerant leaving the expansion engine is completely vaporized, there will be little refrigeration accomplished by the system.

In the other extreme, if liquid refrigerant is allowed to enter the compressors, unnecessary load will be placed on the expansion engine causing a loss of efficiency or mechanical failure.

The present invention provides a refrigeration system which uses a centralized expansion engine to improve the overall efficiency of the refrigeration system. The use of a centralized expansion engine avoids the above described inherent problem associated with the prior art systems that use expansion engines in the evaporators.

Further improvement in efficiency of the refrigeration system of the present invention is obtained by properly controlling the flow of the refrigerant through various elements of the refrigeration system and by subcooling the liquid refrigerant in the condenser at all ambient temperatures.

It has been known in the art that the net refrigerating effect in a refrigeration system can be improved by subcooling the liquid refrigerant before evaporating it in the evaporators. Subcooling the liquid means that some energy is taken out of the liquid refrigerant and, as a consequence, it does not have to be removed by the expansion process in the cooling evaporator, thus, improving the overall efficiency of the refrigeration system. One method of subcooling the refrigerant has been to accumulate the liquid refrigerant leaving the condenser in a reservoir and then circulating that liquid refrigerant through another cooling section. This method produces subcooling at a small additional operating cost, but at an increased capital cost because such a system requires a second condenser and an additional amount of the refrigerant. The use of additional refrigerant is undesirable for the reasons given below.

Also, to achieve subcooling, it is typical to equip the condenser with a flood control device which elevates the condensing pressure of the refrigeration system during low ambient temperatures by reducing the effective condenser surface which is available for condensing. This is accomplished by partially filling (flooding) the condenser with the liquid refrigerant when the condensing pressure is not sufficient. These systems also require greater amounts of refrigerant to accomplish flooding as the ambient temperature drops. The use of additional refrigerant is undesirable because commonly used refrigerants contain Chloro-Fluoro-Carbons ("CFCs") which are harmful to the environment because when they leak into the atmosphere they contribute to the depletion of the earth's upper atmosphere. Refrigerant leaks occur several times over the life of most refrigerant systems. Consequently, the use of additional amounts of refrigerant may dramatically increase the amount of leakage of CFCs from the refrigeration systems into the atmosphere.

Refrigeration systems currently available also attempt to maximize the subcooling effect during the colder periods of the year, i.e., at lower ambient temperatures. One such system is described in U.S. Pat. No. 4,831,835, which performs subcooling during periods of low ambient temperature by utilizing a relatively complicated valve arrangement. This system, however, ignores the subcooling at some ambient temperatures.

U.S. Pat. No. 4,621,505 also discloses means for improving the subcooling effects during low ambient conditions. With respect to subcooling at higher ambients, this patent suggests that in summer operations when the ambient temperature is above 85 to 90 degrees Fahrenheit, the condensation temperature and head pressures will be higher and little or no economic benefit can be expected. The need to benefit from subcooling has been known for some time in the refrigeration industry; however, to date, no method for achieving subcooling in a condenser at all ambient temperatures (high or low) appears to have succeeded in the marketplace. It should be noted that subcooling of a refrigerant to a temperature that is closer to the ambient temperature of the refrigeration system will improve efficiency at all times of the year. Thus, subcooling within the condenser itself at all times, i.e., at all ambient temperatures, is a desirable feature to have in a refrigeration system.

Another type of a subooling system is disclosed in U.S. Pat. No. 4,136,528. It describes a system which provides subcooling to a degree that is sufficient to ensure that the expansion valves operate properly in colder ambient conditions. This system, too, fails to provide subcooling during summer to obtain energy savings.

The prior art systems which utilize subcooling in the condenser have failed to recognize the necessity of holding the refrigerant in the liquid state for some time before allowing it to leave the condenser. In order to make thermal expansion valves function, hold-back valves have been used in the condensate line leaving the condenser to elevate the condensing pressure during low ambient conditions. This method produces liquid subcooling when the condenser is flooded. The hold-back valves used for this purpose have throttling ranges from fully open to fully closed of 20 to 60 psi, which means that an additional inefficiency due to higher condensing pressures during higher ambient and higher flow conditions is introduced.

The refrigeration system of the present invention also addresses the above described subcooling problems associated with the prior art systems and provides a system and method for subcooling the liquid refrigerant in the condenser at all ambient temperatures while utilizing the least amount of refrigerant. Thus, the present invention provides a refrigeration system which utilizes a centralized expansion engine and effects subcooling of the refrigerant in the condenser at all ambient temperatures to improve the overall efficiency of a refrigeration system.

SUMMARY OF THE INVENTION

This invention provides a closed loop refrigeration system that includes a compressor for compressing low pressure gas refrigerant to a high pressure and high temperature gas, a condenser for condensing the high pressure gas refrigerant to a liquid, a reservoir for holding the liquid refrigerant discharged from the condenser, and an evaporator for evaporating the liquid refrigerant at a low pressure to produce cooling. An expansion engine is disposed between the condenser and the reservoir. The expansion of the liquid leaving the condenser drives the expansion engine. The expansion engine in turn drives, at least partially, a secondary compressor disposed between the reservoir and the condenser for discharging gas from the reservoir to the condenser. The expansion of the liquid refrigerant and the removal of the gas from the reservoir provides a low energy refrigerant to the evaporators, thus improving the overall efficiency of the refrigeration system.

Further efficiency improvement is achieved by subcooling the liquid refrigerant in the condenser at all ambient temperatures before it leaves the condenser. A micro-controller control circuit controls the discharge of the liquid refrigerant from the condenser as a function of the temperature difference between the liquid leaving the condenser and the ambient air entering the condenser. The micro-controller control circuit monitors this temperature difference and in response thereto reduces the flow of the liquid refrigerant out of the condenser if this difference is greater than a preselected value and increases the flow if this difference is less than a preselected value. This method achieves the greatest amount of subcooling while minimizing the amount of refrigerant necessary for the subcooling; and, additionally, ensures that the liquid is entering the expansion engine.

Examples of more important features of the invention have been summarized rather broadly in order that the detailed description thereof that follows may be better understood, and in order that the contribution to the art may be better appreciated. There are, of course, many additional features of the invention that will be described in detail hereinafter and which will form the subject of the claims appended hereto.

DESCRIPTION OF THE PREFERRED EMBODIMENT

The present invention provides a refrigeration system wherein improved system efficiency is obtained, in part, by utilizing, among other things, a centrally located expansion engine to supply low energy refrigerant to the system. Additional efficiency improvement is obtained by controlling the refrigerant flow through various system elements and by controlling various system parameters.

Figure 1:
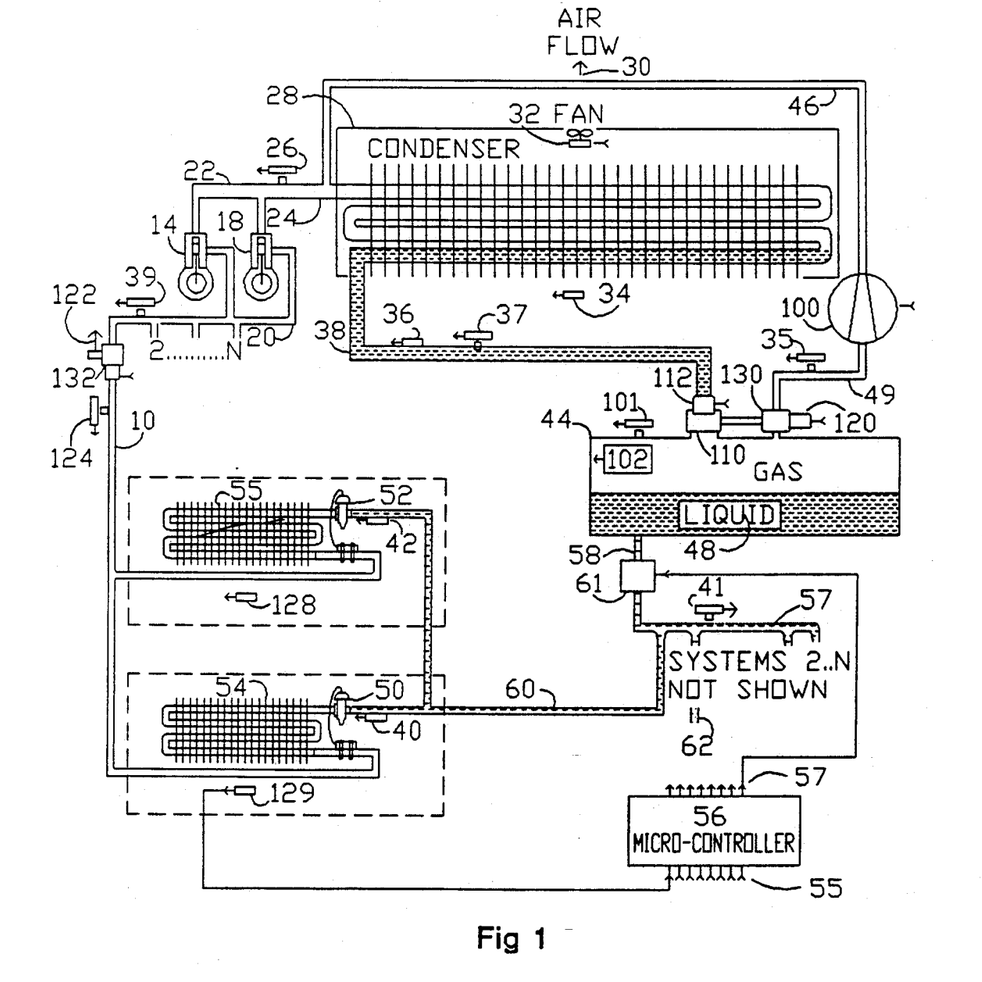
FIG. 1 shows a closed loop vapor cycle refrigeration system having an expansion engine disposed between the condenser and the liquid reservoir and a secondary compressor connected between the reservoir and the condenser inlet.

FIG. 1 shows one embodiment of the refrigeration system of the present invention. This system includes, in a closed loop, compressors for compressing a low pressure gas refrigerant to a high pressure, a condenser for condensing the compressed refrigerant into a liquid refrigerant, a fan for circulating air across the condenser, a control valve for releasing the liquid refrigerant from the condenser to a receiver or reservoir, an expansion engine disposed between the control valve and the reservoir, a secondary compressor which is at least partially driven by the expansion engine to discharge gas refrigerant from the receiver to the condenser, evaporators for evaporating the liquid refrigerant to low pressure gas, and a control circuit for receiving electrical signals from several temperature and pressure sensors in the refrigeration system and in response thereto controlling various system functions and elements of the refrigeration system.

Referring to FIG. 1, low pressure gas refrigerant from a refrigerant tube 10 is passed into compressors 14 and 18 through a suction gas manifold 20. Compressors 14 and 18 compress the low pressure gas refrigerant into a high pressure gas and discharge it through refrigerant tubes 22 and 24 into a condenser 28. A pressure transducer 26 is installed in the refrigerant tube 24, which provides an electrical signal that is representative of the refrigerant pressure in the tube 24 to a micro-controller circuit 56.

The micro-controller circuit 56 contains a microprocessor and other electronic circuitry including memory, analog to digital converters, comparators and switching circuitry, which enable it to acquire electrical signals (information) from various sensors used in the refrigeration system, process that acquired information and in response thereto control a variety of system elements and functions. The micro-controller circuit 56 is operatively coupled to the sensors 26, 34–37, 40–42, 101, 102, 124, 129 and the like through input ports 55 (indicated by inward arrows) for receiving information from these sensors. Outgoing arrows at these sensors indicate that they are electrically coupled to the micro-controller circuit 56. The micro-controller circuit 56 is operatively connected to system elements such as compressors 100 and 120, pump 61, fan 32, and control valve 112 and others through output ports 57 (indicated by outgoing arrows) for controlling the operation of these elements. The system elements which are controlled by the micro-controller circuit 56, have inward arrows to indicate that they are operatively coupled to the micro-controller 56 to receive control signals therefrom.

Still referring to FIG. 1, the discharge refrigerant tube 24 is connected to the condenser 28 where the high pressure gas refrigerant is condensed from a high temperature, high pressure state to a low temperature liquid by circulating air across the condenser 28 by the fan 32 which removes energy from the refrigerant and effects condensation of the refrigerant. A temperature sensor 34 is placed near the condenser 28 to provide an electrical signal representative of the ambient air temperature to the micro-controller circuit 56.

The liquid refrigerant leaves the condenser 28 through a liquid return line 38. A temperature sensor 36 and a pressure sensor 37 are installed on the liquid return line 38, which provide electrical signals to the micro-controller circuit 56 that are representative of the liquid refrigerant temperature and pressure respectively in the condenser. A control valve 112 and an expansion engine 110 combination is disposed between the condenser 28 and a reservoir 44. One end (inlet end) of the control valve 112 is connected to the liquid return line 38 while the other end (outlet end) is connected to the inlet end of the expansion engine 110. The outlet end of the expansion engine, in turn, is connected to the reservoir 44. The control valve 112, whose operation is controlled by the micro-controller circuit 56, regulates the liquid refrigerant flow from the condenser 28 to the reservoir 44 through the expansion engine 110.

Figure 2:
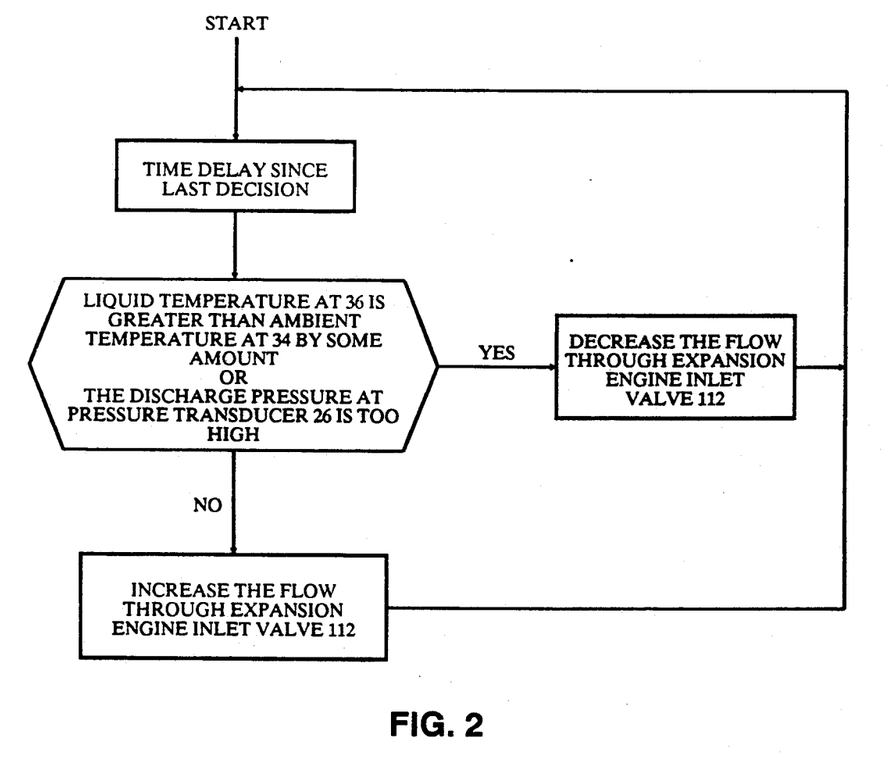
FIG. 2 shows an algorithm for the control of the Expansion Engine of the refrigeration system of FIG. 1.

The operation of the control valve 112 will not be described while referring to FIGS. 1 and 2. FIG. 2 shows an algorithm or control logic which is used by the micro-controller circuit 56 to control the operation of the control valve 112. The micro-controller circuit 56, using information received from temperature sensors 34 and 36, determines the temperature difference between the ambient air temperature and the liquid refrigerant temperature in the condenser. The micro-controller circuit 56 causes the control valve 112 to increase the liquid refrigerant flow therethrough when the temperature difference ("$\Delta t$") between the temperature of the ambient air measured by the temperature sensor 34 and the temperature of the liquid refrigerant in the condenser 28 measured by the temperature sensor 36 drops below a predetermined value and causes it to reduce the flow when the temperature difference is above the predetermined value. Also, if the micro-controller circuit 56 detects that the pressure measured at the discharge pressure transducer 26 is above a predetermined value, it increases the flow rate through the control valve 112 to ensure that the condenser 28 is not excessively flooded because that would elevate the liquid refrigerant pressure and hence the refrigerant temperature in the condenser 28. A time delay between successive decisions to alter the flow through the control valve 112 is programmed into the micro-controller circuit 56 to smooth out the operation of the control valve 112. However, the algorithm of FIG. 2 enables the micro-controller circuit 56 to maintain some amount of the liquid refrigerant in the condenser 28 at all temperatures so as to accomplish subcooling of the liquid refrigerant in the condenser at all temperatures before discharging the liquid from the condenser 28. The liquid refrigerant flow through the control valve 112 may be controlled by either pulse modulating or analog modulating the flow control valve 112. Also, it is desirable not to permit the liquid flow through the condenser to stop completely for that may result in loss of control. This can be accomplished, in the case of a pulse modulated control valve, by providing a minimum pulse width or a minimum duty cycle. The above described control method ensures continuous flooding of the condenser, thus subcooling the liquid refrigerant at all ambient temperatures before it is discharged into the reservoir, which increases the efficiency of the refrigeration system.

Now referring back to FIG. 1, the liquid refrigerant from the control valve 112 is passed through the expansion engine 110 wherein it expands. This expansion process removes some energy from the liquid refrigerant, this energy will not have to be removed elsewhere in the refrigeration system, such as by the evaporators 54 and 55, thereby further improving the overall efficiency of the refrigeration system. The expansion of the liquid refrigerant drives (operates) the expansion engine 110, which in turn rotates a shaft 113 attached thereto, thus converting a portion of the energy contained in the refrigerant into a mechanical energy. This mechanical energy may be used to perform some useful function, such as operating a compressor or generator. In the configuration shown in FIG. 1, the expansion engine is used to operate a secondary compressor 130, which is disposed between the receiver 44 and the inlet of the condenser 28. In this configuration, the expansion engine 110 is coupled to the compressor 130 via the shaft 113. During operation, when the expansion engine is running, it rotates the shaft 113, which in turn operates the compressor 130. The compressor discharges gas refrigerant from the reservoir 44 to the condenser 28, which reduces the reservoir 44 pressure to a level below the condenser pressure and thus, increasing the pressure differential between the condenser pressure and the reservoir pressure. If the expansion engine 110 is unable to provide adequate energy (power) to drive the secondary compressor 130, a secondary power source, such as a motor 120 may be coupled to the expansion engine 110. The motor 120 is used to provide any supplemental energy needed to drive the compressor 130.

In any event, the expansion engine 110, at least, partially operates or drives the secondary compressor 130.

In certain applications, it may be more desirable to have more than one compressor stage between the receiver 44 and the condenser 28 to provide desired pressure differential between the condenser 28 and the reservoir 44. In such applications, a second secondary compressor 100 is connected between the compressor 130 and the condenser inlet via a pipe 46. Compressor 100 usually has its own power source. In this configuration, the first secondary compressor 130 compresses the gas refrigerant from the receiver pressure ($P_r$) to an intermediate pressure ($p_i$) and the second secondary compressor 100 compresses the gas from the intermediate pressure ($P_i$) to the high condenser pressure ($P_h$). As will be obvious, the multi-stage compression allows the use of smaller low-compression-ratio compressors 120 and 100.

The secondary compressors 100 and 130, compress the gas refrigerant from the reservoir 44 to the condenser inlet where it is mixed with the high pressure refrigerant from the compressors 14 and 18. Removing gas from the reservoir 44 reduces the temperature and pressure in the reservoir 44, which further subcools the liquid refrigerant and thus, improves the system efficiency. As noted earlier, the reduced pressure in the reservoir also improves the liquid refrigerant discharge from the condenser 28 to the reservoir 44. The operations of the compressors 100 and 130 are controlled by the micro-controller circuit 56. The micro-controller circuit 56 receives input from a pressure sensor 101 and a liquid level transducer 102 mounted in the reservoir 44 and a temperature sensor 35 which is mounted in the line 49 disposed between the compressors 100 and 130. If the liquid level transducer 102 indicates that the refrigerant level in the reservoir 44 is too high, the micro-controller circuit 56 will turn off the compressors 100 and 120 to prevent any liquid from entering into these compressors. Furthermore, the maintenance of a more constant pressure on the liquid line 60 through the compressor 100 by the micro-controller 56 produces an improved operation of expansion valves 50 and 52. This allows for more energy to be taken out of the refrigerant by secondary compressors 100 and 120, which have a higher coefficient of performance than compressors 14 and 18. This difference in the coefficient of performances results in a certain amount of energy savings for the system of this invention.

Figure 3:
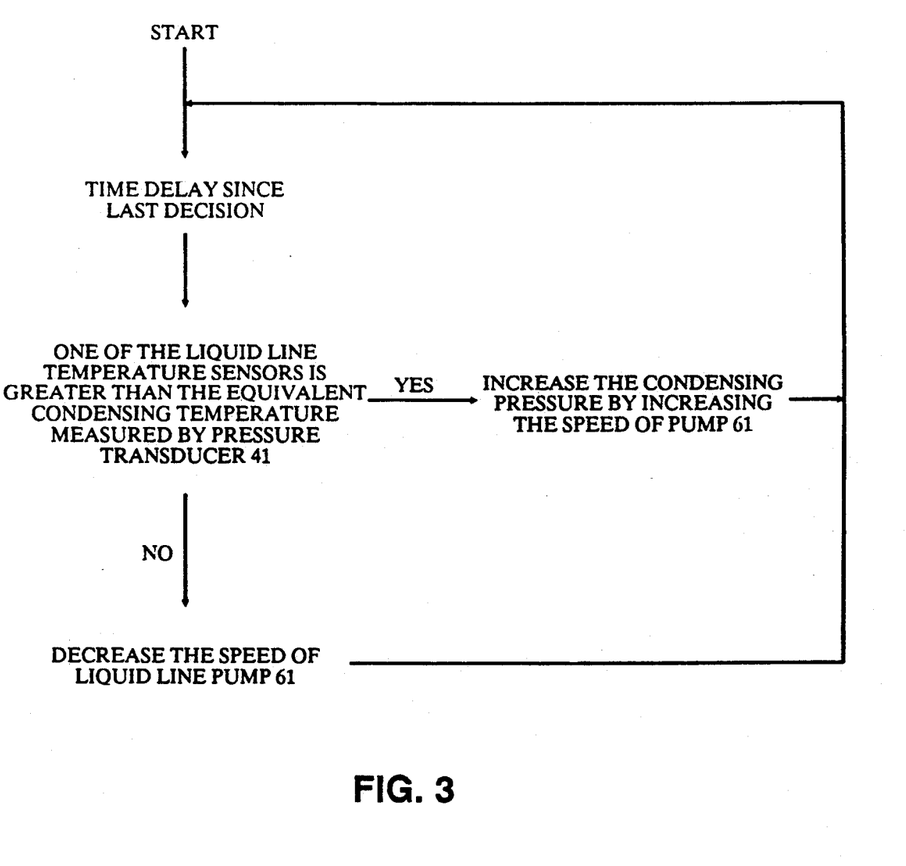
FIG. 3 shows an algorithm for the control of the liquid pump of FIG. 1.

Still referring to FIG. 1, the liquid refrigerant from the reservoir 44 flows into a manifold 57 via a tube 58. A liquid pump 61 is disposed in the tube 58, which is used to maintain desired liquid refrigerant pressure in the manifold. The micro-controller circuit 56 controls the pump 61 in response to the information from the sensors 40-42. FIG. 3 shows the algorithm which is used by the micro-controller to effect the liquid pump 61 control. The micro-controller circuit 56 causes the pump 61 to increase the pump speed, and thus the liquid line pressure, when either of the temperature sensors 40 or 42 in conjunction with the pressure sensor 41 indicate that their respective values are above the condensing temperature. Otherwise, the pump speed is decreased to decrease the liquid line pressure. A time delay between successive decisions to alter the pump speed is programmed into the micro-controller circuit 56 to smooth out the operation of the pump 61.

Each expansion valve 50 and 52 is connected to separate evaporators 54 and 55 respectively. These evaporators form a single temperature refrigeration system wherein the expansion valves 50 and 52 meter the liquid refrigerant into evaporators 54 and 55 respectively. Similarly, other refrigeration systems (not shown) may be connected to the liquid manifold system 57 through tubes 62 and the like. When the liquid refrigerant is metered through the expansion valves 50 or 52, it evaporates into a gaseous state within its respective evaporator at a low pressure and a low temperature. The vapor refrigerant is passed to the compressors 14 and 18 through the suction refrigerant tube 10 which completes a refrigerant cycle that is continuously repeated during operation. The refrigeration system of FIG. 1 is of multi-evaporator, multi-temperature type. In practice, the evaporators 50, 52 and the like in larger systems are typically remotely located. Such applications offer added utility because only one centralized expansion engine, such as expansion engine 110, may be utilized for the entire refrigeration system without requiring a separate expansion engine for each evaporator. Additionally, the use of a single centralized expansion engine makes servicing the refrigeration system easier.

In some applications, it may be desirable to connect an expansion engine evaporator regulator (EEER) 132 in line 10. The micro-controller 56, in response to temperature sensors 128 and 129 or a pressure sensor 124, determines the desired flow rate through the EEER 132. The EEER 132 powers a generator 122. The flow through EEER 132 may be controlled by a duty cycled solenoid valve (not shown in detail) or may be continuously modulated. In either case, the flow is increased when a colder temperature in the evaporators 54 and 55 is desired and decreased when a warmer temperature is desired. The refrigerant vapors from the EEER 132 enter the manifold so the cycle repeats itself. It should be apparent that the EEER 132 can be used in a conventional multi-temperature refrigeration system alone or in conjunction with other improvements described herein.

Figure 4:
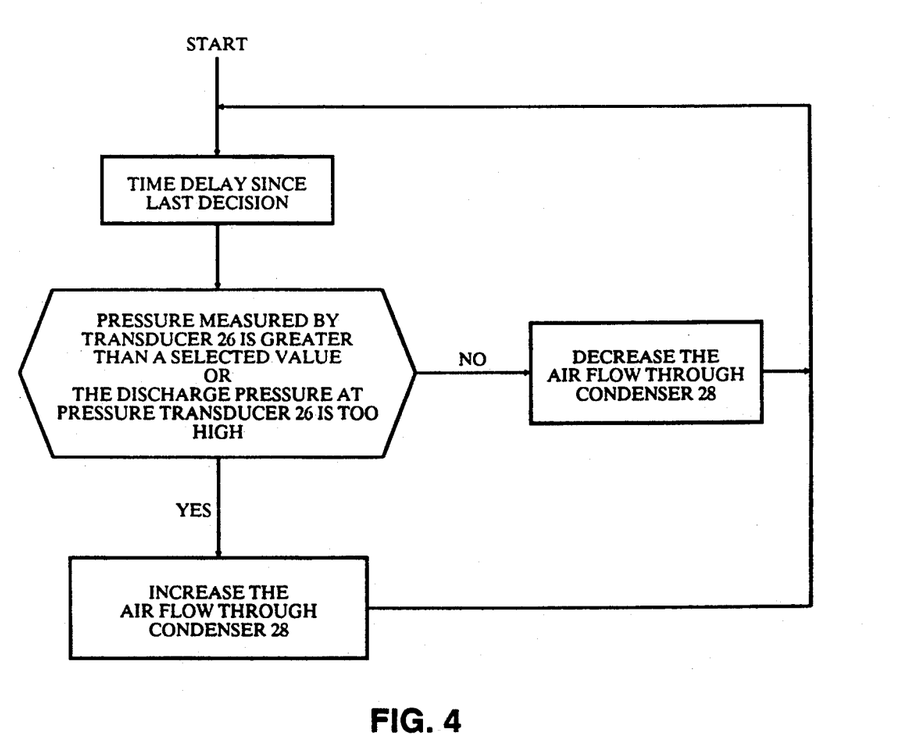
FIG. 4 shows an algorithm for the control of the condenser fans of the refrigeration system of FIG. 1.

Further improvement in the overall system efficiency may be obtained by regulating the fan speed as a function of the discharge pressure of the gaseous refrigerant into the condenser. The micro-controller 56 also controls or regulates the fan 32 to optimize the condensation of the gaseous refrigerant within the condenser 28. The flow chart of FIG. 4 shows the control logic for the fan 32. As shown in FIG. 4, when the pressure represented by the pressure transducer 26, i.e., the discharge pressure of the gaseous refrigerant entering into the condenser 28 is above a predetermined value, the micro-controller will increase the fan speed, thereby causing it to increase air flow through the condenser. On the other hand, when the discharge pressure is below a predetermined value, the micro-controller will decrease the fan speed, thereby decreasing the air flow through the condenser. Also, a time delay between successive speed controls is provided to avoid changing the fan speed too frequently. While the invention has been described in accordance with air cooled condensers, one experienced in the art may easily apply the present invention to water or fluid cooled condensers of all sorts. These embodiments have not been specifically described because they are considered redundant in application of the invention in view of the above description.

Thus, the closed loop refrigeration system of the present invention contains a centralized expansion engine disposed in between a condenser and a receiver.

The liquid refrigerant from the condenser passes through the expansion engine wherein it expands and drives the expansion engine. The liquid refrigerant leaving the expansion engine is discharged into the receiver. The expansion engine in turn drives, at least partially, a compressor for discharging the gas refrigerant from the reservoir to the condenser. The expansion of the liquid refrigerant in the expansion engine and the removal of the gas from the reservoir reduces the energy of the liquid refrigerant before it is fed to the evaporators, which improves the overall efficiency of the refrigeration system. Further efficiency improvements are obtained by: (1) subcooling the liquid refrigerant in the condenser at all ambient temperatures before discharging it into the expansion engine; (2) regulating the air circulation around the condenser; (3) utilizing an expansion engine evaporator regulator in the suction line; and (4) by controlling the refrigerant flow through various elements of the refrigeration system.

A significant advantage of the above described refrigeration system is that a large majority of the existing refrigeration systems can easily be modified to incorporate significant aspects of the present invention, such as the centralized expansion engine, subcooling the liquid refrigerant in the condenser at all ambient temperatures and regulating the air circulation around the condenser.

The foregoing description is directed to particular embodiments of the invention for the purpose of illustration and explanation. It will be apparent, however, to one skilled in the art that many modifications and changes to the embodiments set forth above are possible without departing from the scope and the spirit of the invention. It is intended that the following claims be interpreted to embrace all such changes and modifications.

What is claimed is:

1. A refrigeration method comprising the steps of:
(a) condensing a high pressure gas refrigerant in a condenser to a high pressure liquid refrigerant;
(b) passing the high pressure liquid refrigerant from the condenser through an expansion engine for expanding the high pressure liquid refrigerant and for driving the expansion engine;
(c) discharging the refrigerant from the expansion engine into a reservoir containing therein gas and liquid refrigerants; and
(d) compressing the gas refrigerant from the reservoir to the high pressure by a compressor which is at least partially driven by the expansion engine and discharging the compressed refrigerant into the condenser.

2. The method of claim 1 further comprising the step of shutting down the compressor when the liquid refrigerant level in the reservoir is above a predetermined level.

3. A refrigeration system having a reservoir containing refrigerant therein, said refrigeration system comprising:
(a) A condenser for receiving gas refrigerant at an inlet end, said condenser condensing the gas refrigerant into a liquid refrigerant and discharging the liquid refrigerant through an outlet end;
(b) an expansion engine connected between the outlet end of the condenser and the reservoir for receiving the liquid refrigerant from the condenser, the liquid refrigerant expanding in the expansion engine to drive the expansion engine;
(c) a compressor disposed between the reservoir and the condenser inlet for discharging gas refrigerant from the reservoir to the condenser; and
(d) means for shutting down the compressor when the liquid refrigerant level in the reservoir is above a predetermined level.

4. A method of achieving refrigeration in a closed loop refrigeration system comprising the steps of:
(a) condensing a high pressure gaseous refrigerant in a condenser to a high pressure liquid refrigerant;
(b) passing the high pressure liquid refrigerant from the condenser through an expansion engine for expanding it to a medium pressure liquid refrigerant and for driving the expansion engine;
(c) discharging the medium pressure liquid refrigerant from the expansion engine into a reservoir having at the medium pressure a body of liquid and gaseous refrigerants therein;
(d) compressing the gaseous refrigerant from the reservoir to an intermediate pressure by a first compressor which is at least partially driven by the expansion engine;
(e) compressing the intermediate pressure gaseous refrigerant to the high pressure by a second compressor and discharging it to the condenser; and
(f) shutting down the first and second compressors when the liquid refrigerant level in the reservoir is above a reservoir to the high pressure by a compressor which is at least partially driven by the expansion engine and discharging the compressed refrigerant into the condenser.

5. A method of achieving refrigeration in a closed loop refrigeration system comprising the steps of:
(a) condensing high pressure gaseous refrigerant in a condenser to a high pressure liquid refrigerant;
(b) passing the high pressure liquid refrigerant from the condenser through an expansion engine for expanding it to a medium pressure liquid refrigerant and for driving the expansion engine;
(c) discharging the medium pressure liquid refrigerant from the expansion engine into a reservoir having at medium pressure a body of liquid and gaseous refrigerants therein;
(d) compressing the gaseous refrigerant from the reservoir to an intermediate pressure by a first compressor which is at least partially driven by the expansion engine;
(e) compressing the intermediate pressure gaseous refrigerant to the high pressure by a second compressor and discharging it to the condenser;
(f) evaporating the liquid refrigerant from the reservoir in an evaporator to a low pressure gas; and
(g) compressing the low pressure gas from the evaporator by a third compressor into the high pressure gaseous refrigerant and passing it to the condenser.

6. A method of achieving refrigeration in a closed loop refrigeration system comprising the steps of:
(a) condensing gaseous refrigerant in a condenser to a liquid refrigerant at a high pressure;
(b) computing the temperature difference between the temperature of the liquid refrigerant in the condenser and the ambient temperature;
(c) discharging the liquid refrigerant from the condenser through a control valve into an expansion engine for expanding the liquid refrigerant and driving the expansion engine, the control valve causing the liquid refrigerant discharge to increase when the temperature difference is less than a predetermined value and causing it to decrease when the temperature difference is greater than the predetermined value;

(d) passing the refrigerant from the expansion engine into a reservoir containing gaseous and liquid refrigerants; and (e) compressing the gaseous refrigerant from the reservoir to the high pressure by a compressor which is at least partially driven by the expansion engine and discharging the compressed refrigerant into the condenser.

7. A method of achieving refrigeration in a closed loop refrigeration system having a primary compressor, a condenser and an evaporator, the method comprising the steps of:

(a) condensing high pressure gaseous refrigerant from the primary compressor in the condenser to a liquid refrigerant;

(b) determining the temperature difference between the liquid refrigerant and the ambient temperatures;

(c) controllably discharging the liquid refrigerant from the condenser into a reservoir containing liquid and gaseous refrigerant through an expansion engine, said liquid refrigerant expanding the liquid refrigerant and driving the expansion engine while it passes through the expansion engine, and said liquid refrigerant discharge being controlled by increasing the discharge when the temperature difference is less than a predetermined value and decreasing the discharge when the temperature difference is greater than the predetermined value so as to maintain at least some amount of liquid refrigerant in the condenser at all ambient temperatures during operation;

(d) maintaining the reservoir pressure at a value below the condenser pressure by discharging gaseous refrigerant from the reservoir into the condenser by a compressor system which is at least partially driven by the expansion engine; and (e) evaporating the liquid refrigerant from the reservoir in an evaporator to a low pressure gas.

8. A closed loop refrigeration system having a reservoir containing therein liquid and gas refrigerants, comprising:

(a) an evaporator coupled to the reservoir for receiving liquid refrigerant therefrom and evaporating it into a low pressure gas;

(b) a first compressor coupled to the evaporator for compressing the low pressure refrigerant from the evaporator into a high pressure gas;

(c) a condenser having an inlet and outlet end, the inlet end of the condenser connected to the first compressor for receiving high pressure gas therefrom and condensing it into a liquid;

(d) a control valve having an inlet end and outlet end, the inlet end of the control valve connected to the condenser outlet end, the control valve receiving the liquid refrigerant from the condenser and controllably discharging that liquid refrigerant into the reservoir;

(e) an expansion engine connected to the outlet end of the control valve and the reservoir for receiving the liquid refrigerant from the control valve, expanding it and discharging the expanded refrigerant into the reservoir; and (f) a second compressor coupled to the expansion engine and connected to the reservoir, the second compressor being partially driven by the expansion engine for compressing the gas from the reservoir to the high pressure and discharging it to the condenser.

9. The refrigeration system of claim 8 further comprising:

(a) a third compressor connected between the second compressor and the condenser inlet, said third compressor compressing the gas from the second compressor to the high pressure and mixing it with the high pressure gas from the first compressor; and (b) an evaporator connected to the reservoir for evaporating the liquid refrigerant from the reservoir into a low pressure gas.

10. The refrigeration system of claim 8 further comprising:

(a) a first temperature sensor connected to the condenser for providing an electrical signal representative of the liquid refrigerant temperature therein;

(b) a second temperature sensor placed near the condenser for providing an electrical signal representative of the ambient temperature; and (c) a control circuit electrically coupled to the first and second temperature sensors and the control valve, the control circuit determining the temperature difference between the ambient temperature and the condenser liquid refrigerant temperature and in response thereto causing the control valve to increase the liquid discharge therethrough when the temperature difference is less than a predetermined value and to increase the discharge when the temperature difference is greater than a predetermined value.

11. A refrigeration system having a reservoir containing refrigerant therein, said refrigeration system comprising:

(a) A condenser for receiving gas refrigerant at an inlet end, said condenser condensing the gas refrigerant into a liquid and discharging the liquid refrigerant through an outlet end;

(b) an expansion engine connected between the outlet end of the condenser and the reservoir for receiving the liquid refrigerant from the condenser, the liquid refrigerant expanding in the expansion engine to drive the expansion engine;

(c) a compressor connected between the inlet end of the condenser and the reservoir for discharging gas refrigerant from the reservoir to the condenser, said expansion engine coupled to the compressor and at least partially operating the compressor; and (d) a control circuit operatively coupled to the compressor, said control circuit shutting down the compressor when the liquid level in the reservoir is above a predetermined level.

12. A refrigeration system having a reservoir containing refrigerant therein, said system comprising:

(a) a condenser for receiving gas refrigerant at an inlet end, said condenser condensing the gas refrigerant into a liquid and discharging the liquid refrigerant through an outlet end;

(b) an expansion engine connected between the outlet end of the condenser and the reservoir for receiving the liquid refrigerant from the condenser, the liquid refrigerant expanding in the expansion engine to drive the expansion engine;

(c) a compressor connected between the reservoir and the inlet end of the condenser for compressing gas refrigerant from the reservoir to the condenser, said expansion engine also coupled to the compressor and at least partially operating the compressor; and (d) a motor coupled to the compressor for supplementing expansion engine energy to the compressor at a rate that is sufficient for the compressor to compress the gas refrigerant from the reservoir pressure to the condenser pressure.

13. The apparatus of claim 12 further comprising a control circuit operatively coupled to the compressor, said control circuit shutting down the compressor when the liquid level in the reservoir is below a predetermined level.

* * * * *